United States Patent
Kolesa

[15] 3,678,900
[45] July 25, 1972

[54] PROCESS AND CULTCH FOR CULTIVATING AND HARVESTING SHELLFISH

[72] Inventor: Claudine Marie Kolesa, 2207 S. Washington Ave., Titusville, Fla. 32780

[22] Filed: July 17, 1970

[21] Appl. No.: 55,727

[52] U.S. Cl. ..............................................................119/4
[51] Int. Cl. ......................................................A01k 61/00
[58] Field of Search......................................................119/4

[56] References Cited

UNITED STATES PATENTS

| 3,017,857 | 1/1962 | Munz | 119/4 |
| 456,390 | 7/1891 | Willis | 119/4 |
| 3,347,210 | 10/1967 | Golub | 119/4 |
| 3,029,785 | 4/1962 | Mahed | 119/4 |

FOREIGN PATENTS OR APPLICATIONS

| 1,181,974 | 11/1964 | Germany | 119/51 CF |

*Primary Examiner*—Aldrich F. Medbery
*Attorney*—Mason, Fenwick & Lawrence

[57] ABSTRACT

A process for cultivating and harvesting shellfish, particularly oysters, wherein a continuous, permanent cultch is progressively formed by inserting one ring through another to provide a series of interlocked loops or links, and the cultch is laid on the bottom of a waterway to collect spat and hold the spat during growth to mature oysters. The oysters are harvested by raising the cultch progressively, removing marketable oysters, and returning the cultch progressively to the waterway bottom following oyster removal. A cultch laying barge and a harvesting barge are disclosed schematically.

9 Claims, 6 Drawing Figures

Patented July 25, 1972 BEST AVAILABLE COPY 3,678,900

INVENTOR

CLAUDINE MARIE KOLESA

BY
Mason, Fenwick & Lawrence
ATTORNEYS

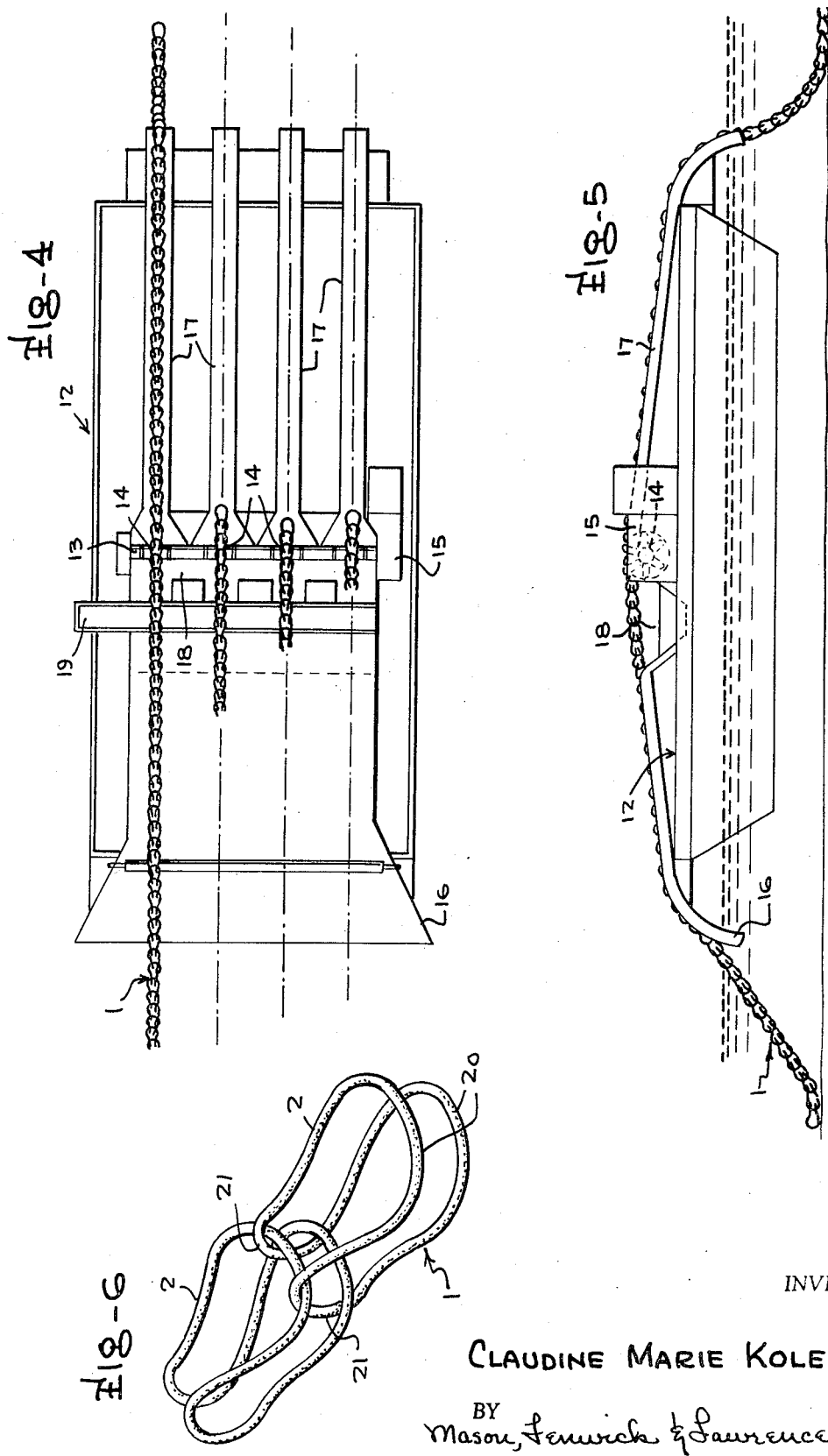

PROCESS AND CULTCH FOR CULTIVATING AND HARVESTING SHELLFISH

BACKGROUND OF THE INVENTION

This invention relates to a process for cultivating and harvesting shell fish of the clinging variety, that is shell fish which attach themselves to a surface and remain there during life, and is particularly concerned with the cultivation and harvesting of oysters.

The conventional method of cultivating and harvesting oysters has been to select an area for a bed, dump oyster shells, or other debris to which the spat (baby oysters) can attach, and, when the oysters are mature, harvest them by bringing them to the surface by means of tongs. The dumping of oyster shells, or other debris, called cultch, into the water provides clean surfaces to which the spat can attach, and prevents loss of the baby oysters by sinking into the mud of the bottom.

Numerous efforts have been made to improve this method of oyster cultivation and harvesting to reduce the great amount of manual labor required, and overcome defects, such as the time involved, limited depth to which tonging can be accomplished, and the rather haphazard procedure by which the whole process is carried out.

As a first step, mechanical dredging was suggested as a substitute for manual tonging in harvesting. While this method greatly speeded up harvesting and reduced manual labor, it permanently damaged bottom areas where oysters were grown, and, as a consequence, dredging is not permitted in some areas.

Another suggestion has been the hanging of cultch from floats, or other devices, the cultch being composed of interfitted rings, or other members, to provide a great volume of surface area to which the spat can attach. The cultch is drawn up at harvest time and the mature oysters removed. While this method is a considerable improvement, the depth to which the cultch can be lowered is quite limited.

It has also been proposed that continuous cultch forming material of alternating rigid and flexible sections be lowered into an area where spawning oysters are located, so that the spat may attach to the artificial cultch. When spat has been collected, the cultch is retrieved and cut into small sections, with each section having one or more of the miniature oysters attached. These small pieces are then transported to a growing area, attached to a flexible member, and lowered to the bottom to grow. After maturity, the flexible member with the sections of cultch material attached is retrieved, and the oysters removed from the sections of cultch to which they had been attached during growth. The original cultch material is discarded, and a new cultch forming member must be obtained for lowering into the seeded area for another crop of spat. This method, while having many advantages over the conventional procedure, requires considerable work, for the cultch forming material must be lowered to collect spat, retrieved, cut into sections, the sections secured to a handling member, the handling member with the cultch sections attached lowered into a growing area, and later again retrieved for harvesting. The method is expensive also, for each crop of oysters requires the use of another length of cultch forming material.

SUMMARY OF THE INVENTION

The general object of the present invention is to provide an improved process for cultivating and harvesting clinging shell fish, such as oysters, which will eliminate much of the labor required by previous methods, permit operation of greatly expanded areas, and materially reduce the cost per shell fish ready for market.

A more specific object is the provision of a process that includes the laying of a permanent cultch on which the spat is collected, the oysters grow, and which forms a reusable means for retrieving mature oysters.

Another object is to provide a process in which the cultch is assembled as it is paid out for submersion into the water.

A further object of the invention is to provide a process wherein a permanent cultch is retrieved from the bottom, mature oysters removed, and the cultch relaid to collect more spat and for continued growth of oysters which are immature when the cultch is raised at harvest time.

Still another object is to provide a process by which oysters may be grown at any water depth at which oysters will live, on any type of bottom, and over any desired area.

Yet another object of the invention is to provide a process utilizing a continuous cultch which can be of any desired length due to the assembly of the cultch as it is laid, whereby the vessel where the assembly is being made can be supplied with additional cultch elements if it cannot carry a sufficient supply for a cultch of exceptional length.

It is also an object of the invention to provide a process for cultivating and harvesting oysters wherein a cultch is assembled of elements of discarded material, such as beads of worn automobile tires, to provide a continuous, flexible, reusable cultch at extremely low cost.

Other objects of the invention will become apparent from the following description of one practical embodiment thereof, when taken in conjunction with the drawings which accompany, and form part of, the specification.

BRIEF DESCRIPTION OF THE DRAWINGS

FIG. 4 is a somewhat diagrammatic top plan view of a barge used in harvesting oysters;

FIG. 5 is a side view of the vessel shown in FIG. 4; and

FIG. 6 is a perspective view of several of the interlocked members making up the cultch.

DETAILED DESCRIPTION OF THE PREFERRED EMBODIMENTS

Figure 2:
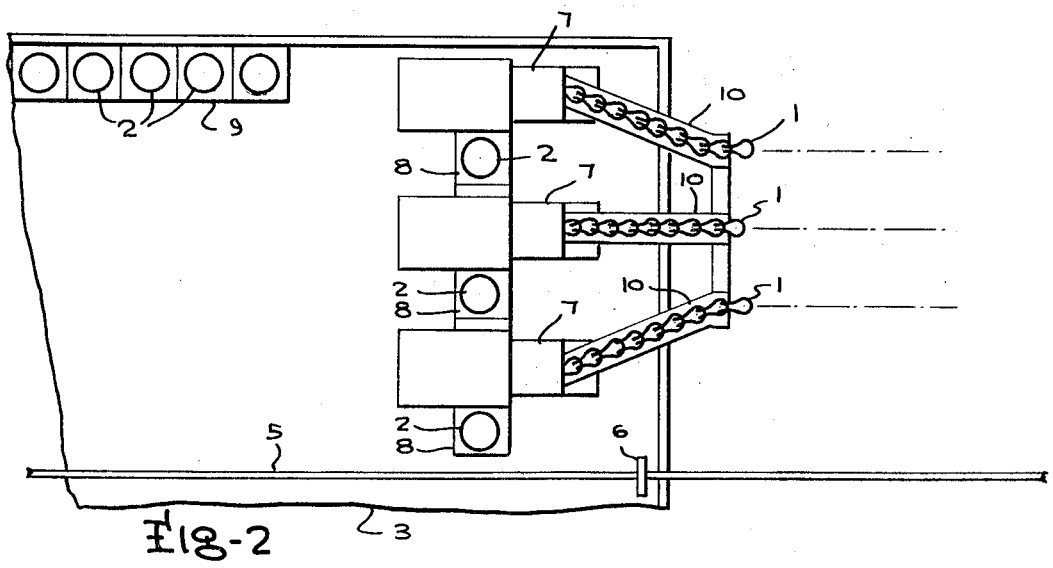
FIG. 2 is a somewhat diagrammatic top plan view of the rear portion of a barge used in laying the cultch.
Figure 3:
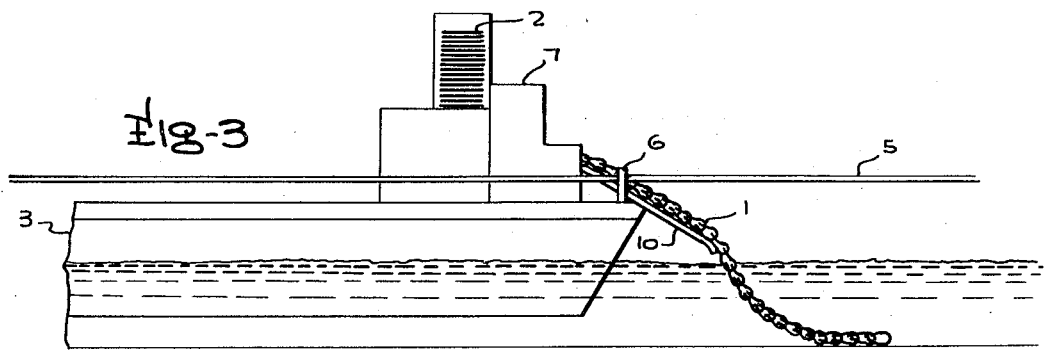
FIG. 3 is a side view of the structure shown in FIG. 2.
Figure 1:
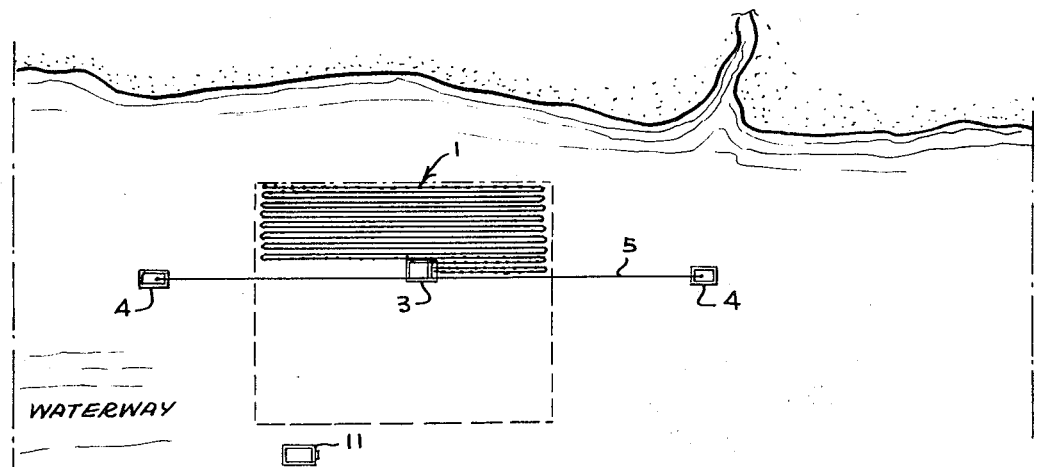
FIG. 1 is a diagrammatic view of a waterway, illustrating a partially laid cultch, together with the various barges, or other vessels, used in laying the cultch.

In carrying out the present process, a suitable area of waterway is selected as the site where the cultivation of the oysters will take place. A barge, or other suitable vessel, having means for linking circular elements to provide a continuous cultch is moved to the selected site, and as the barge moves over the site, the linking mechanism will take circular links from the supply, and passing one loop through the next, will bend the loop over until its opposite edges are adjacent. Another loop will then be taken passed through the adjacent edges of the last and folded as before. This process will continue to form an elongated flexible cultch member. As the cultch is formed, it moves along a guideway into the water until it reaches the bottom. As the barge moves, the formed cultch will be laid in a straight line across the selected area. By traversing the area in opposite directions as many times as may be required to cover the bottom of the selected area, a continuous covering for the bottom is obtained. The length of the individual strands of cultch are sufficient so that the cultch is maintained in a substantially horizontal position, traversing any holes that may be present in the bottom and being held by adjacent sections of the cultch against sinking in muddy sections of the bottom. The cultch forms an expanded area of surface to which spat can attach, as will be described, so that surface area of many times the square foot area of the bottom on which the cultch is laid is obtained for the growth of oysters.

After the cultch is laid, the area is seeded by placing oysters of spawning age about the perimeter of the cultch. This will ultimately result in spat flow across the entire area, and spat drop and spat set on all areas of cultch.

After the seeding step, the cultch is left undisturbed for a period sufficient for the attachment of spat and the growth of the spat into mature oysters ready for harvesting. When this time arrives, an end of the continuous cultch filament is passed over a harvesting barge and the end of the cultch returned to the water. As the barge moves, the cultch is progressively raised from the bottom, passes across the harvesting barge, and returns to rest upon the bottom of the waterway. As the cultch moves across the harvesting barge, oysters of marketable size are removed from the cultch.

As the cultch is returned to the water after the marketable oysters have been removed, those oysters which had not yet reached marketable size can continue to grow. A new batch of spat will drop onto the cultch during the next spawning season, and a new crop of oysters will be obtained. After the cultch is once formed and laid, and the initial seeding step is taken, it is only necessary to return to the site at harvest times to temporarily, and progressively, raise the cultch, remove marketable oysters, and return the cultch to the waterway bottom.

While the above steps comprise the process for the cultivation and harvesting of oysters, it is contemplated that the process will be practiced in a more sophisticated way, using appropriate equipment to reduce manual labor, increase the speed of operation, and reduce operating costs to provide greater profits from a given area. While the apparatus which will be used will form the subject matter of additional patent applications, a brief description of the somewhat diagrammatically shown pieces of equipment will be given to complete disclosure of a practical way of performing the process.

The continuous cultch 1 may be composed of a series of rings 2, interlocked with one another to form a continuous, chain like member. It is desirable that the rings of which the cultch is composed be somewhat flexible, and it has been found that the beads cut from old automobile tires are excellent for this purpose. It is estimated that a cultch formed of such members will have a life of approximately 15 years.

In order to form the chain like member of the cultch, a ring 2 is folded over upon itself along its central diameter, with the two opposite sides of the ring being brought into adjacency, as shown in FIG. 6. Another loop is inserted into the loops of the adjacent opposite sides of the first, and it is folded over in similar manner so that a continuous flexible member is formed. The geometry of each individual link is chosen with care, for the quantity of oysters that will grow in any suitable site is a function of the available cultch surface area. The present link, has a surface area of approximately 150 square inches, with each link occupying but approximately 50 square inches of bed area. This provides a 3 to 1 increase in growing surface.

It is contemplated that a barge 3 will be used to lay the cultch on the chosen site. In order to assure precision in laying the cultch, anchor barges 4 may be positioned on opposite sides of the chosen site, and a guide line 5 strung between them traversing the bed area. The laying barge 3 may have guides 6, fore and aft, through which the guide line 5 passes to maintain the laying barge on a straight line course.

The barge 3 will carry one or more cultch assembling, or linking, devices 7 at its stern. The linking devices will pick rings 2 from sources of supply 8, and interloop them in the manner mentioned above. Separate stores 9 of rings may be located conveniently about the barge deck. As the cultch is formed, it slides down a guide 10 over the stern of the barge and into the water. If more than one linking device 7 is employed, the outlet ends of the several guides 10 will be spaced apart at the distance that separate strands of the cultch be placed upon the waterway bottom. When the barge has traversed the selected site, the guide line 5 will be released from the laying barge and the anchoring barges will be moved to the next parallel location. After turning the laying barge around, it will be reconnected to the guide line and traverse the bed in the opposite direction laying one or more strands of the cultch in parallel relation to those previously laid. This operation will be continued until such time as the entire selected bed is covered. If required, supply barges 11 may be used to bring additional quantities of rings 2 to the laying barge to complete the cultch.

When the bed has been completed, by laying all the cultch, the end of the cultch may be tethered to a float, or some other device above water, so that it may be available when needed to retrieve the cultch.

The seeding of the bed may take place in any desired manner. Normally, the oysters to be used for spawning purposes will be placed around the perimeter of the cultch so as to get good spat flow across the entire cultch.

The cultch is not disturbed during the time that the spat are forming, dropping, attaching themselves to the cultch, and growing to maturity. After sufficient time has elapsed for the oysters to be of mature size, a harvesting barge 12 will be brought to the bed, and the ends of the cultch members will be detached from their anchoring means and passed over the barge.

The barge has a shaft 13 extending across it, and the shaft carries one or more sprockets, or toothed wheels, 14, which engage the links of the cultch. A suitable motor 15, or other suitable drive means, may be used to rotate the shaft. As the shaft rotates, the engagement of the sprockets with the one or more lines of cultch, will cause the barge to move across the oyster bed. As the barge moves, cultch will be lifted from the bottom, move up an apron 16 at the front of the barge, across the sprockets, and along guides 17 at the stern for relowering into the water. As this operation takes place, the cultch is lifted and returned to its original position. As the cultch moves along the barge, it passes over a work area 18, where workmen may be positioned to remove marketable oysters from the cultch as it moves along. A conveyor 19 is arranged transversely of the barge and extends to a shuttle barge to carry the harvested oysters from the harvesting barge to the shuttle barge. As one shuttle barge is loaded, it can carry its oysters to the dock while an unloaded barge takes its place to receive subsequently harvested oysters.

The harvesting barge will be moved back and forth along the bed until the entire bed has been traversed. When this is done, all of the oysters of marketable size have been harvested and the cultch is back in its original position for another growing season. Once laid, the cultch will last for many years, and it need be disturbed only at harvest time when it is progressively raised, the oysters removed, and the cultch returned to the bed. As explained above, the cultch is a continuous flexible member, made up of a series of links. These links are originally circular in shape, and each link is formed by passing one of the rings through the folded over ends of the preceding ring. This changes the ring from its round shape to an elongated shape, and when the ends are folded over to lie in superimposed relation, each link comprises a pair of overlying horizontal loops 20, and a pair of parallel, vertical loops 21, thus, the ring shaped member becomes one which has oppositely extending pairs of parallel loops, with the loops extending in one direction being at right angles to the loops which extend in the opposite direction. As each loop is formed, its forwardly extending horizontal loops 20 are positioned to receive another ring. By this manner of construction, the simple insertion of one ring through the overlying loops of the preceding one forms a lock so that the cultch becomes a highly flexible member composed of a plurality of links.

By using the process and cultch herein described, the cultivation and harvesting of oysters is greatly simplified. The manual labor involved is so greatly reduced that a crew of a given number can maintain and harvest oyster crops many times the size of that previously possible with the same number of men. Not only is the volume increased, but the actual physical labor imposed upon the crew is greatly decreased, so the larger crop is produced with less hardship to the men.

While in the above one practical method of carrying out the process of the present invention has been disclosed, it will be understood that the details described and shown are merely by way of illustration, and the invention may be practiced in other ways than that herein disclosed.

What is claimed is:

1. A process for cultivating and harvesting shellfish comprising, laying a continuously connected permanent cultch on a selected area of waterway bottom, seeding the area with shellfish of spawning age, allowing shellfish growth upon said cultch and periodically thereafter raising the cultch progressively from the bottom, removing shellfish of marketable size and returning the continuously connected cultch having small shellfish attached to the waterway bottom progressively as the shellfish are removed for further growth of the shellfish.

2. A process for cultivating and harvesting shellfish as claimed in claim 1 including the additional step of forming the cultch progressively during the cultch laying step.

3. A process for cultivating and harvesting shellfish as claimed in claim 1 including the further step of transporting the shellfish removed from the cultch to a place of storage.

4. A process for cultivating and harvesting shellfish comprising, forming a continuously connected, permanent cultch by inserting a plurality of ring shaped members one through another in succession, to produce an elongated flexible member in the form of a chain composed of continuous ring links, laying the cultch as formed on a selected area of waterway bottom, raising said cultch to remove marketable shellfish and returning said cultch to the waterway bottom.

5. A process for cultivating and harvesting shellfish as claimed in claim 4 wherein, the cultch is raised progressively of its length for the removal of shellfish, and returned progressively of its length after shellfish removal.

6. The process of claim 4 including deforming each said ring shaped member out of original shape by bending said ring shaped member back on itself to interlock with adjacent members.

7. A cultch for use in cultivating and harvesting shellfish comprising, a plurality of continuous closed loops each forming a link of substantial three dimensional proportions for attachment of shellfish, each loop being deformed and folded with loop integrity intact to form an elongated flexible chain member of interlocked loops.

8. A cultch for use in cultivating and harvesting shellfish as claimed in claim 7 wherein, each loop is a ring-shaped member inserted through an adjacent link and folded over upon itself.

9. A cultch for use in cultivating and harvesting shellfish as claimed in claim 7 wherein, the links are the bead sections of tires for motor vehicles.

* * * * *